(12) United States Patent
Hou

(10) Patent No.: US 6,826,689 B1
(45) Date of Patent: Nov. 30, 2004

(54) METHOD AND SYSTEM FOR EMULATING A SECRET CODE BETWEEN TWO HARDWARE MODULES

(75) Inventor: Chien-Tzu Hou, Fremont, CA (US)

(73) Assignee: Geneticware Co., Ltd., Tortola (VG)

( * ) Notice: Subject to any disclaimer, the term of this patent is extended or adjusted under 35 U.S.C. 154(b) by 0 days.

(21) Appl. No.: 09/411,581

(22) Filed: Oct. 1, 1999

(51) Int. Cl.[7] .......................... H04L 9/00; H04K 9/00; H04K 1/00
(52) U.S. Cl. .................... 713/182; 380/277; 380/278; 380/260; 380/273; 713/171; 713/168
(58) Field of Search ................. 380/277, 278, 380/260, 273; 713/171, 168

(56) References Cited

U.S. PATENT DOCUMENTS 4,218,582 A * 8/1980 Hellman et al. ............. 380/30
6,009,174 A * 12/1999 Tatebayashi et al. ........ 380/277

* cited by examiner

Primary Examiner—Justin T. Darrow
Assistant Examiner—Cas Stulberger
(74) Attorney, Agent, or Firm—Knobbe Martens Olson & Bear LLP

(57) ABSTRACT

A method and system for emulating a secret code between a first hardware module to a second hardware module. First, the secret code that is initially stored in the first hardware module is transformed into a transformed secret code according to a transformation pattern randomly selected from a set of possible transformation patterns. Then the transformed secret code is transferred to the second hardware module. Next, the second hardware module can repeatedly guess a hypothetical secret code from the transformed secret code by using a transformation pattern selected from the possible transformation patterns and reversing the effect of the selected transformation pattern on the transformed secret code. In addition, the hypothetical secret code is used to encode a test sample, and the encoded test sample is sent back to the first hardware module. Accordingly, the first hardware module can verify the validity of the current hypothetical secret code by checking the encoded test sample. After proving that a current hypothetical secret code is the same as the true secret code, the first hardware module informs the second hardware module of such a match result and stops the process.

14 Claims, 6 Drawing Sheets

METHOD AND SYSTEM FOR EMULATING A SECRET CODE BETWEEN TWO HARDWARE MODULES

BACKGROUND OF THE INVENTION

1. Field of the Invention

The present invention relates in general to an information exchange technology, more specifically, to a method and system for transferring a secret code or secret information between two hardware modules. The transfer process is called secret code emulation. These two hardware modules are capable of secretly communicating with each other by using the original secret code and the emulated secret code only known by them.

2. Description of the Related Art

Key distribution is an important and fundamental issue in modern cryptosystems. The purpose of the key distribution is to distribute useful encryption/decryption information (or called encryption/decryption keys) over communication hosts for communicating with each other and to prevent illegal hosts or persons from intercepting the key-related information, thereby eavesdropping communication data or forging certificates. Modern cryptosystems can be categorized into two classes, where one is named as symmetric or secret-key systems and another is named as asymmetric or public-key systems. Implementations of the key distribution for these two kinds of cryptosystems are respectively described as follows with reference to the accompanying drawings.

FIG. 1 (Prior Art) is a schematic diagram of a conventional symmetric system, such as DES (Data Encryption Standard), for illustrating the key distribution scheme thereof. In the symmetric system, the sender (data source) and the receiver (data destination) use the same key, KEYC, to encrypt/decrypt private data. In FIG. 1, communication host 1 acts as the sender and communication host 2 acts as the receiver. Communication host 1 involves cipher 3, which uses $KEY_C$ to encrypt plaintext 10 into ciphertext 20. Ciphertext 20 can be distributed over public networks, such as LANs or the Internet, by setting communication host 2 to be the destination host. In addition, communication host 2 involves cipher 4. After fully receiving ciphertext 20, cipher 4 uses the same key $KET_C$ to decipher ciphertext 20 to obtain recovered text 12. In the symmetric cryptosystem, it is assumed that the common key $KEY_C$, shared by both ends is distributed in a private and secure manner and cannot be intercepted during the distribution process. In reality, however, it is difficult to find out a transmission medium that can completely comply with this security requirement. It also reveals that crackers are capable of breaking through such cryptosystem by stealing the encryption key from the distrusted transmission medium.

FIG. 2 (Prior Art) is a schematic diagram of the conventional asymmetric cryptosystem system, such as the RSA system. Unlike the symmetric cryptosystem, asymmetric cryptosystems use different public keys and private keys for encryption and decryption, respectively. As shown in FIG. 2, communication hosts 1 and 2 employ the ciphers (5, 6) and (7, 8) to implement practical data encryption/decryption processes, which are similar to that of the symmetric cryptosystem does. However, each of the communication-hosts owns its private/public key pair. The private key and the public key of communication hosts 1 are denoted as $KETA_{PRI}$ and $KETA_{PUB}$, and those of communication host 2 are denoted as $KETB_{PRI}$ and $KETB_{PUB}$, respectively. It is noted that private keys are confidentially contained in their communication hosts, but public keys must be released to the public. In the case shown in FIG. 2, public key $KEYA_{PUB}$ of communication host 1 is acquired by communication host 2, and public key $KEYB_{PUB}$ of communication host 2 is also acquired by communication host 1.

Data transmission examples are now illustrated. Suppose that communication host 1 is ready to transmit a document to communication 2 in a secure manner. The first step is that cipher 5 employs public key $KETB_{PUB}$ of communication host 2 to encrypt this document. After encryption, the cipher document is transmitted from communication host 1 to communication host 2 over the interconnection network. Because communication host 2 sustains private key $KEYB_{PR}$ paired with public key $KETB_{PUB}$ applied to encrypt this document, the cipher document can be deciphered by cipher 6 using private key $KETB_{PRI}$. In the similar manner, communication host 2 can use public key $KETA_{PUB}$ of communication host 1 to decrypt secret data, and communication host 1 can use its private key $KETA_{PRI}$ to decrypt the secret data. It is noted that key distribution can be readily achieved by disseminating these public keys to the public. The basic security assumption in conventional asymmetric cryptosystems is that the release of public keys will not cause protection defect of the cryptosystem.

As described above, the conventional symmetric cryptosystem and the asymmetric cryptosystem adopt different approaches to handling the key-distribution issue. In the symmetric system, the key-related information must be kept confidential and exchanged by means of a secure transmission medium. However, it is almost impossible to guarantee the privacy of the key exchange process in the real world. Therefore, from the aspect of key distribution, there is a security hole in the conventional symmetric cryptosystem. On the other hand, key distribution can be achieved by freely releasing the public keys in the conventional asymmetric cryptosystems. In other words, key exchange can be performed straightforwardly. Therefore, key distribution of the asymmetric cryptosystem can be fulfilled in an easier way than that of the symmetric cryptosystem.

In addition, most of the conventional cryptosystems use the cryptographic algorithms based on mathematics to encrypt data, especially in the asymmetric cryptosystems. For example, the RSA cryptosystem is designed on the basis of prime factoring problems. Therefore, the most common implementations of such cryptosystems are written by software. In the case shown in FIG. 2, ciphers 5 and 6 usually represent software packages that are designed for performing the required cryptographic algorithms and executed in communication hosts 1 and 2, respectively. Necessary keys, including $KEYA_{PUB}$, $KEYA_{PRI}$, $KEYB_{PUB}$ and $KEYB_{PRI}$ are supplied by users or automatically generated by key-generating software. Sometimes ciphers can be implemented by hardware for speeding up processing. No matter how these conventional cryptosystems are implemented, the fundamentals of the keys are still unchanged, that is, the determination of these keys strongly depends on the cryptographic algorithms and the keys can be accessed by the users.

According to the above description, the cryptographic algorithms of the conventional cryptosystems are known, but decryption keys are unknown. Therefore, the security performance of a cryptosystem involves two things: ensuring that nobody can decipher decrypted data based on the known cryptographic algorithms and the public keys, and carefully hiding the private key in the public-key cryptosystem and the secret key in the secret-key cryptosystem. It is obvious that a system is unsafe if its key information is reached by crakers. In fact, current cryptosystems still use user-defined keys, or allow users to acquire key information in some situations. It takes an advantage of device-independence and users can easily use their keys in any system supporting the same cryptographic algorithms. This feature, however, also provides a path for crackers to reach the hidden information.

A better solution to this problem is to plunge these keys in the hardware and to restrict the access path to these keys, thereby blocking the illegal access to the keys. However, embedding the keys in the hardware also introduces a problem, how to share key information between two hardware modules having the feature. The present invention deals with the key-exchange issue in such situation.

SUMMARY OF THE INVENTION

Therefore, an objective of the present invention is to provide a system and method for emulating a secret code, which can be a real key or a key ancestor, between two independent but coupled hardware modules. Secret code emulation means a process that a communication host replicates the secret code hidden within another communication host. In addition, the secret code is still kept in secret during and after the emulation process.

The present invention achieves the above indicated objectives by providing a system including a first hardware module and a second hardware module for communicating with each other, where the first hardware module has a secret code that is not accessible from outside and the second hardware module can emulate the secret code. The first hardware module comprises a device for storing a test sample and a device for transforming the secret code into a transformed secret code according to a transformation pattern randomly selected from a set of possible transformation patterns. Then the transformed secret code can be transferred from the first hardware module to the second hardware module. The second hardware module comprises a recovering logic circuit for restoring the transformed secret code to obtain hypothetical secret codes by recursively trying the set of the possible transformation patterns and an encoder for encoding the test sample into an encoded test sample by using each of the hypothetical secret codes. Each encoded test sample is sent to the first hardware module. The first hardware module further comprises a decoder for decoding the encoded test sample received from the second hardware module into a temporary sample by using the true secret code and a comparator for comparing the temporary sample with the test sample stored in the storing device and informing the second hardware module of the comparison result. When the comparison result shows that the temporary sample and the secret code are matched, the recovering logic circuit stops and the current hypothetical secret code will be equivalent as the secret code.

In addition, the present invention also provides an emulation method performed in such system. First, the secret code initially stored in the first hardware module is transformed into a transformed secret code according to a transformation pattern randomly selected from the predefined set of the possible transformation patterns. Then the transformed secret code can be transferred from the first hardware module to the second hardware module. It is impossible to directly acquire the true secret code from the transformed secret code unless someone can predict which of the possible transformation pattern will be selected. Next, the second hardware module can recursively guess a hypothetical secret code from the transformed secret code by selecting one from the possible transformation patterns and reversing the effect of the selected pattern on the transformed secret code until a comparison match result is received.

The comparison match result is verified and issued by the first hardware module. The second hardware module uses the current hypothetical secret code to encode a test sample into an encoded test sample and send the encoded test sample to the first hardware module for verification. Thus the first hardware module uses the true secret code to decode the encoded test sample into a temporary sample and compare it with the original test sample. If they are matched, it means that the current hypothetical secret code is correct. Therefore, the first hardware module can inform the second hardware module of comparison match. Then the secret code is successfully transferred from the first hardware module to the second hardware module.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

Figure 1:
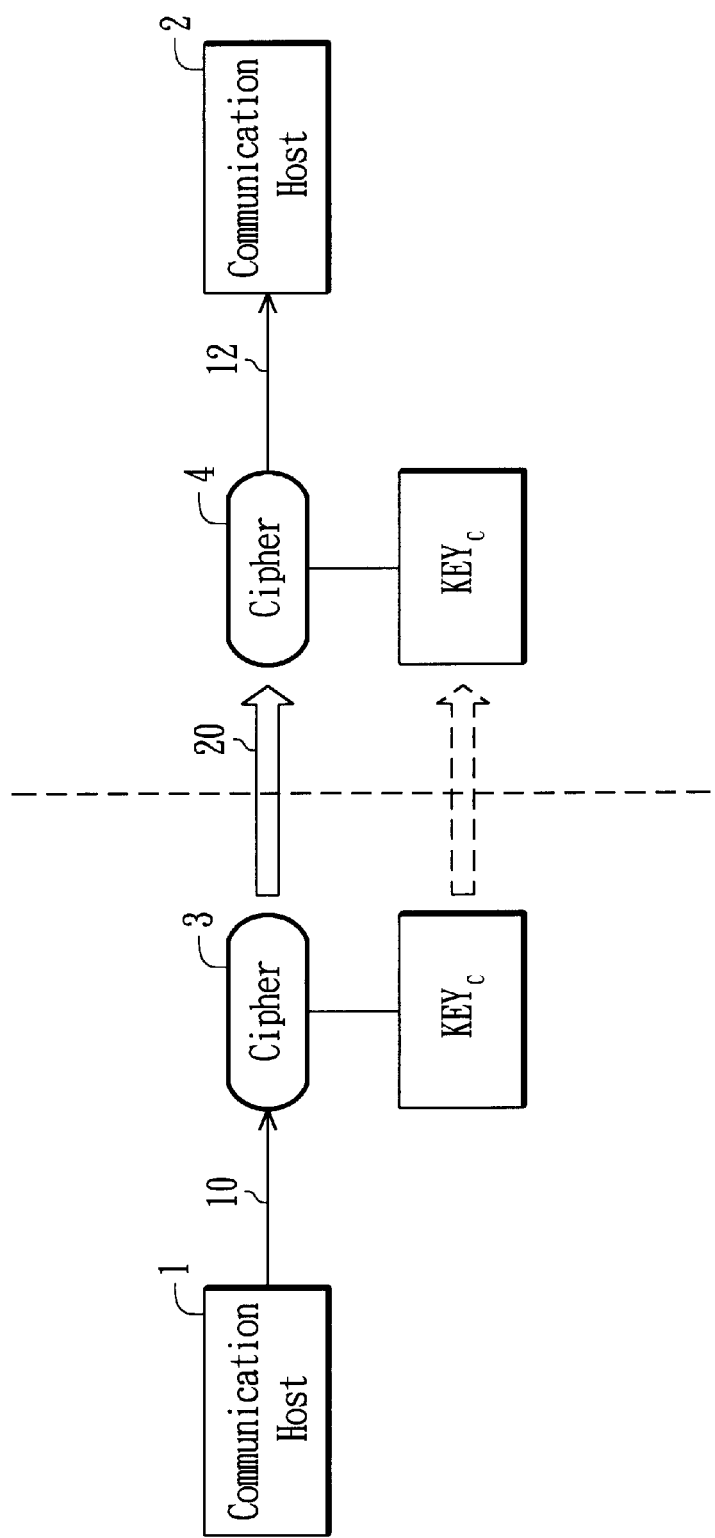
FIG. 1 is a schematic diagram of the conventional secret-key cryptosystem illustrating the key distribution scheme thereof.
Figure 2:
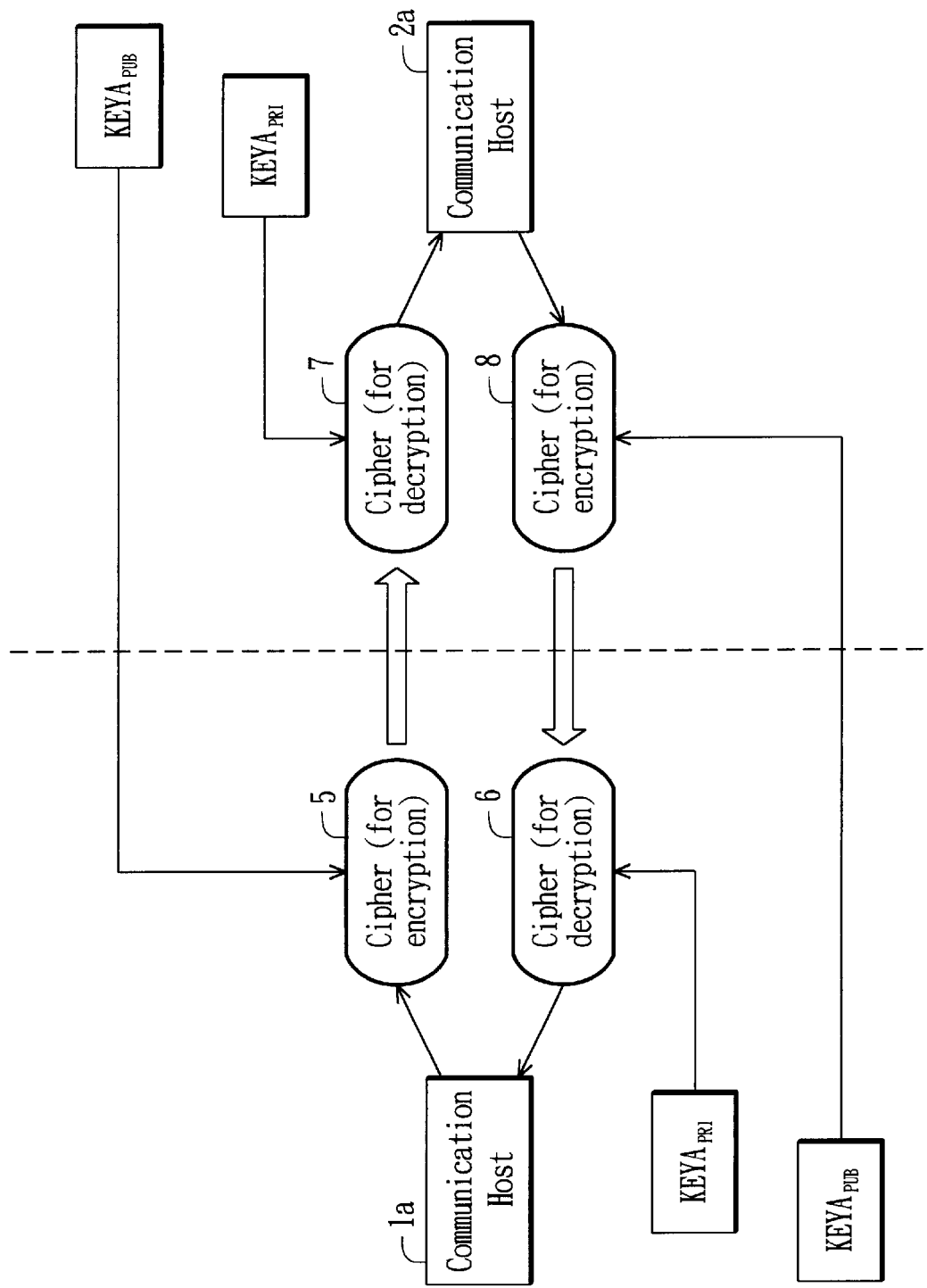
FIG. 2 is a schematic diagram of the conventional public-key cryptosystem illustrating the key distribution scheme thereof.
Figure 3:
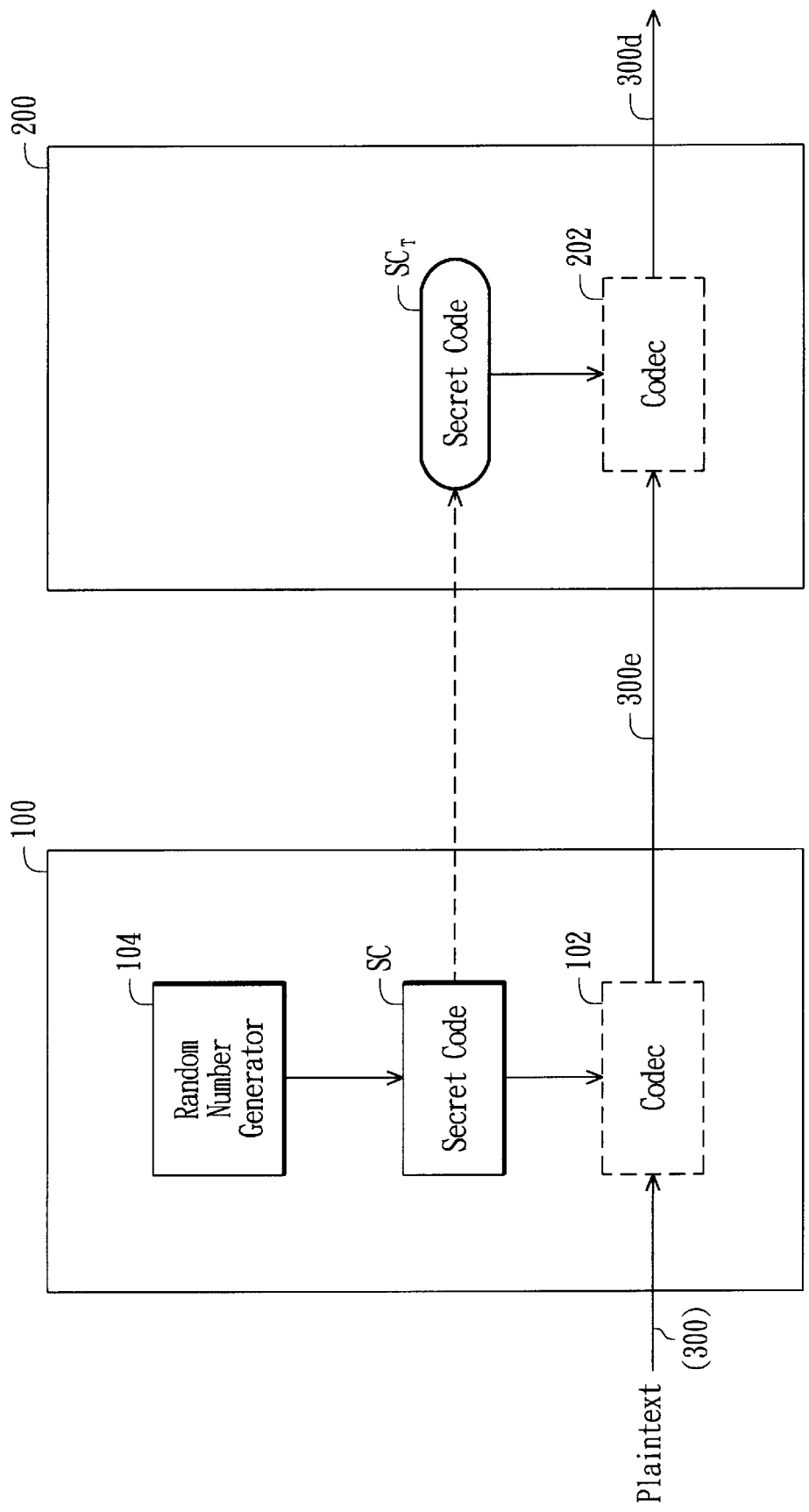
FIG. 3 illustrates a block diagram of a cryptosystem in which secret codes are embedded in hardware modules in accordance with the present invention.

FIG. 3 illustrates a block diagram of a cryptosystem of the present invention comprising hardware modules containing secret codes therein. More specifically, the secret code in each hardware module may be used as a key for hardware encoding/decoding, or may be used to derive a true key for hardware encoding/decoding. Hardware modules 100 and 200 are separately located at different communication hosts that are to be communicated with each other. In this example, the host containing hardware module 100 serves as the sender and is to transmit plain data 300 to the host containing hardware module 200.

As shown in FIG. 3, hardware module 100 includes a random number generator 104, which is used to internally produce an embedded secret code SC of hardware module 100. Secret code SC can be safely hidden within hardware module 100 and cannot be accessed from outside since there is no physical access path to secret code SC in hardware module 100. In reality, secret code SC could not be only established by random number generator 104, but also by other schemes. For example, secret code SC can consist of a part of data generated by random number generator 104 and a part of data defined by users. It is noted that secret code SC in such case is still kept in secret since nobody can acquire the complete information of secret code SC, especially the part generated by random number generator 104. Usually, the generated secret code SC should be maintained in a memory device embedded in hardware module 100.

In addition, hardware module 100 further comprises encoding logic 102 for practically encoding the plaintext 300. Encoding logic 102 can directly use secret code SC as an encoding key or deduce a true encoding key from secret code SC, which has been described above. No matter how to generate the encoding key, encoding logic 102 can encode plaintext 300 to obtain an encoded text 300e by using secret code SC.

As shown in FIG. 3, hardware module 200 serving as the receiver has a decoding logic 202 for practically decoding the encoded text 300e received from hardware module 100, and a storage media for keeping emulated secret code $SC_T$ equivalent to secret code SC hidden within hardware module 100. If hardware module 200 really owns emulated secret code $SC_T$ that is equivalent to secret code SC, the encoded text 300e can be correctly decoded as a decoded text 300 by decoding logic 202 by using secret code $SC_T$. The only remaining issue is how to confidentially transfer secret code SC from hardware module 100 to hardware module 200. The following discussion will concentrate on this issue.

Figure 4:
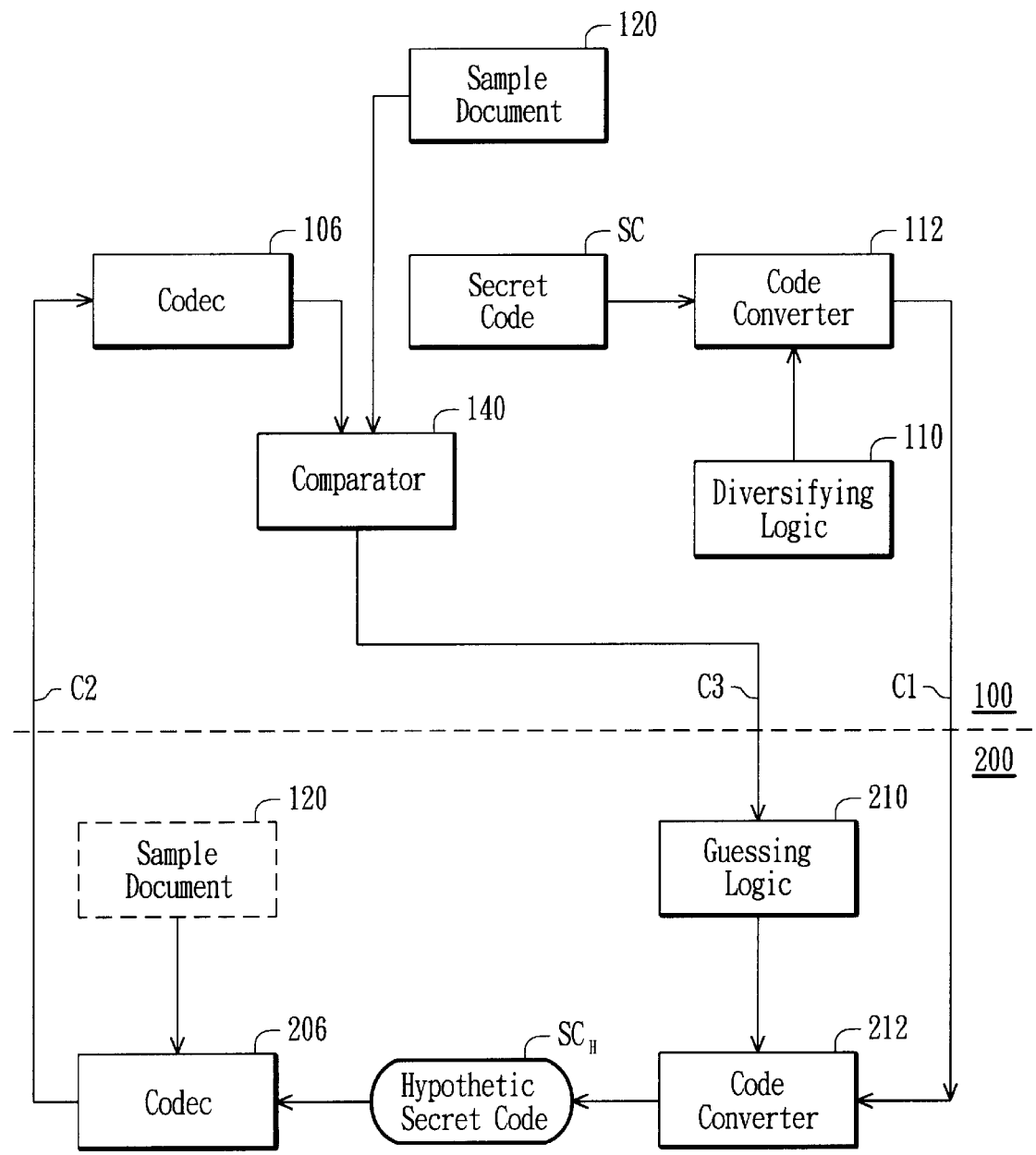
FIG. 4 illustrates the detailed block diagram of the cryptosystem involving two hardware modules for illustrating the key distribution scheme in accordance with the present invention.

FIG. 4 is a detailed block diagram of the cryptosystem for demonstrating the process of hardware module 200 emulating secret code SC from hardware module 100. As shown in FIG. 4, hardware module 100 comprises a decoding logic 106, a storage device for storing secret code SC, a storage device for storing a test sample 120, a diversifying logic 110, a code processor 112 and a comparator 140. On the other hand, hardware module 200 comprises a diversifying logic 210, a code processor 212 and an encoding logic 206.

The secret-code emulation process is briefly described as follows. As described above, the secret code hidden within hardware module 100 cannot be directly accessed since there is no physical access path to the storage device for storing the secret code. In this embodiment, secret code SC must be transformed according to a transformation pattern randomly selected from a set of possible transformation patterns, which are defined in advance for hardware modules 100 and 200. The issue concerning to these possible transformation patterns will be further described later. Hereafter, secret code SC being transformed is called the transformed secret code, which will be passed to hardware module 200. After properly receiving the transformed secret code, hardware module 200 can guess one belonging to the set of the transformation patterns defined in advance and generate a hypothetical secret code from the transformed secret code by reversing the transformation effect of the guessed one. In addition, hardware module 200 can use the hypothetical secret code being generated to encode a test sample known by both sides, and send the encoded test sample to hardware module 100 for verification. Then hardware module 100 can use the true secret code SC to decode the encoded test sample received from hardware module 200, and verify whether the decoding result is equal to the original test sample. In fact, hardware module 200 usually cannot guess right in only several tries. Therefore, such guess-and-verify process will continue until hardware module 200 guesses right.

In the above discussion, the issue pertaining to the possible transformation patterns should be further discussed. As described above, these transformation patterns determined in advance are designed to scramble the true secret code, thereby hiding important information pertaining to the true secret code during the emulation process. Obviously, the number of all possible transformation patterns may determine the complexity of the guess-and-verify process. In other words, as the number of the possible transformation patterns increases, the guess-and-verify method requires more time to successfully emulate the secret code in average. Furthermore, whether the transformation patterns are disclosed or not may also affect the implementation of the guess-and-verify method. It is clear that the emulation process is absolutely secure if the information about the transformation patterns is completely hidden within the hardware modules. For example, assume that the bit length of the secret code is 64 and the number of the possible transformation patterns is only 4. Although there are only four transformation patterns applied in this case, the total combination space of the secret code, according to any transformed secret code, is still $2^{64}$. In other words, the emulation process can be secretly performed even in a public network. On the other hand, if the information about the transformation patterns is known, the emulation process must involve a large number of possible transformation patterns or be performed in a private connection to guarantee the confidentiality of the secret code. In addition, it is noted that users can only activate the emulation process, but cannot change the procedure of the emulation process. The whole emulation process is controlled only by the two anticipating hardware modules.

Figure 5:
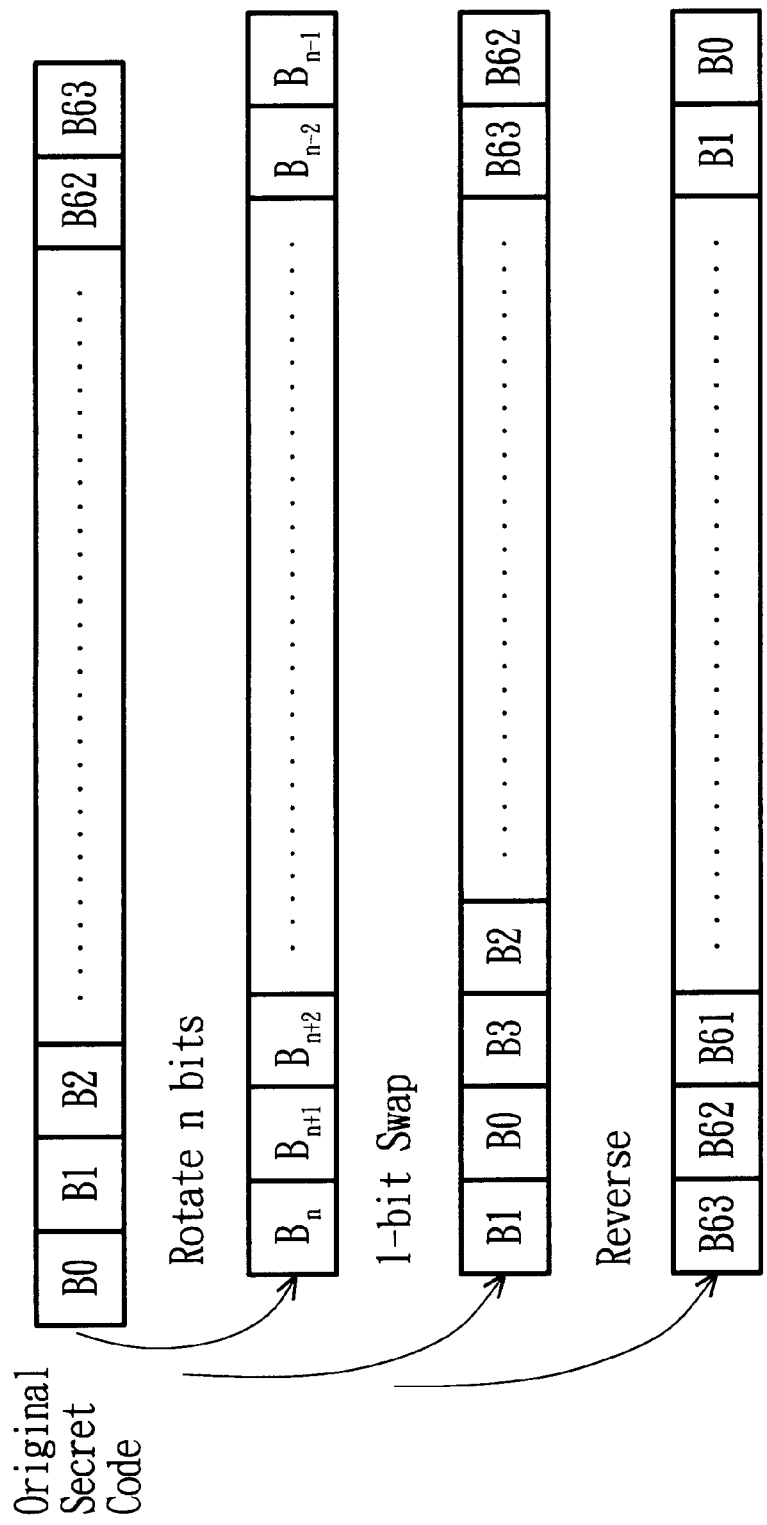
FIG. 5 shows some examples of the possible transformation patterns used in the embodiment of the present invention.

FIG. 5 shows some examples of the transformation patterns that can be used in this embodiment. In these examples, assume the original secret code contains 64 bits sequentially labeled as B0, B1, B2 . . . B62 and B63. The first example involves a bit-rotation operation, which rotates the bits of the secret code by n bits (n is a positive integer) in a specific rotation direction. As shown in FIG. 5, the result of the bit-rotation operation (rotating left by n bits) has a leading bit $B_n$, and an ending bit $B_{n-1}$. The second example involves a bit-swap operation, which swaps the order of the odd bits (B0, B2, . . .) and the adjacent even bits (B1, B3, . . .). This bit-swap operation, as shown in FIG. 5, makes these bit pairs (B0, B1), (B2, B3) . . . (B62, B63) change their bit order. The third example involves an order-reversing operation, which reverses the normal order of the bits contained in the secret code. FIG. 5 has illustrated the result of reversing the 64 bits of the secret code. In reality these operations can be merged or modified to acquire a variety of transformation patterns. In general, the number of the transformation patterns determined in advance is proportional to the security level of the emulation process.

Returning back to FIG. 4, in hardware module 100, diversifying logic 110 and code processor 112 are used to transform the original secret code SC. Diversifying logic 110 is responsible for randomly choosing one from the complete set of all possible transformation patterns in each emulation process, and thus employs the chosen one to control the operation of code processor 112. Code processor 112 is used to perform a transforming operation on the bits of the secret code SC under the control of diversifying logic 110, thereby generating the transformed secret code 114. Then transformed secret code 114 and test sample 120 are packed into a communication packet C1, and transferred from hardware module 100 to hardware module 200. It is noted that the operation of diversifying logic 110 is not manually controlled.

In hardware module 200, recovering logic 210 and code processor 212 are used to guess the true secret code based on the transformed secret code 114 contained in the packet C1. The basic function of recovering logic 210 is similar to that of diversifying logic 110. The difference between them is that recovering logic 210 will repeatedly perform the same operation until it guesses right. Diversifying logic 110 usually performs one time in each emulation process, but recovering logic 210 operates repeatedly until the correct secret code is found. Code processor 212, under the control of recovering logic 210, is used to reverse the effect of the transformation pattern locally selected by recovering logic 210, thereby reproduce the hypothetical secret code $SC_H$. Encoding logic 206 uses the hypothetical secret code $SC_H$ to encode the test sample 120 contained in packet C1 in every phases of the emulation process. The encoded test sample encoded by using the hypothetical secret code $SC_H$ should be packed into the communication packet C2 and transferred to hardware module 100 for verification.

After receiving the encoded test sample, decoding logic 106 in hardware module 100 can use the true secret code SC to recover the original test sample. Hereinafter, the result of decoding the encoded test sample is called a temporary test sample. Next, the temporary test sample and the test sample 120 are together fed to comparator 140. If recovering logic 210 guesses wrong, the temporary test sample and the original test sample 120 will be different. On the other hand, if recovering logic 210 guesses right, the temporary test sample and the original test sample 120 are the same. In this case, comparator 140 can inform recovering logic 210 of the comparison match result via the communication packet C3. When recovering logic 210 is informed of the comparison match result, the hypothetical secret code $SC_H$ in the current phase is regarded to be correct. Accordingly, hardware module 200 successfully emulates the secret code SC.

It is noted that the data transferred between the hardware modules 100 and 200 during the emulation process, including the packets C1, C2 and C3, do not contain the exact secret code SC. As described above, packet C1 contains the test sample 120 and the transformed secret code 114. Packet C2 contains the encoded test sample. Packet C3 contains the comparison result. Therefore, the secret code SC can be safely concealed within hardware module 100 and within hardware module 200.

In addition, the above embodiment is not intended to limit the scope of the present invention and can be modified and adjusted to fit the various applications. For example, in the above embodiment, the test sample 120 is initially stored in hardware module 100 and will be transferred to hardware module 200 at the starting point of the emulation process. However, it is understood by those skilled in the art that the test sample also can be stored in hardware module 200 and transferred to hardware module 100, or previously determined by both sides.

It is of extraordinary importance to distinguish data transmission and the secret-code emulation process. In the embodiment, the emulation process requires a lot of handshaking steps to verify the validity of the hypothetical secret codes guessed by the receiver. Therefore, such emulation process is time-consuming and not suitable for normal data transmission. In addition, it is preferable that such secret code emulation is performed in a private peer-to-peer communication environment. When the emulation process between two hardware modules is successfully completed, two hosts involving these two hardware modules can be classified as the same group since they share the same or related code information. In other words, they can communicate with each other in a secure manner. As described above, such hardware-oriented code information is determined within the hardware module and cannot be accessed by any persons. This is different to the conventional cryptosystems, which utilize the encryption/decryption keys that users can access.

Figure 6:
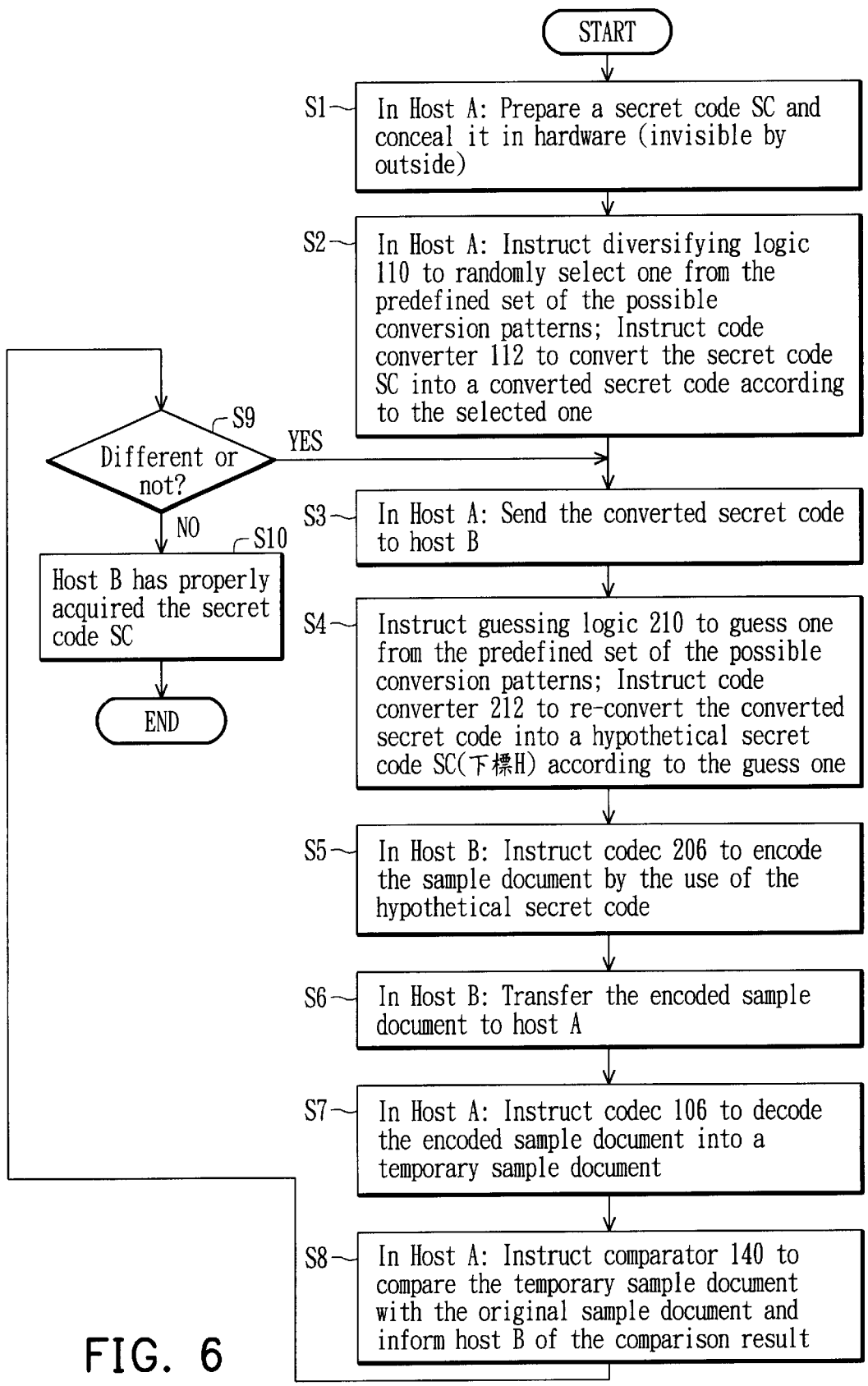
FIG. 6 is a flowchart of the secret code distribution process applied in the cryptosystem in which the secret codes are embedded in the hardware modules in accordance with the present invention.

FIG. 6 is a flowchart of the emulation process illustrated in this embodiment. In this case, host A represents the host serving as the secret code source in the emulation process. In addition, host B represents the host ready to emulate the secret code. The detailed steps of the emulation process are illustrated as follows. First, host A prepares a secret code in the hardware module (step S1). As described above, the secret code is invisible from outside of the hardware module and can be generated by a random number generator. Next, host A transforms the secret code according to one of the possible transformation patterns decided by diversifying logic 110 (step S2). Then host A sends the transformed secret code and a test sample to host B (step S3). The remaining steps will focus on how to guess the true secret code from the transformed secret code.

After receiving the transformed secret code, host B guesses a hypothetical secret code from the transformed secret code by a selected transformation pattern decided by recovering logic 210 (step S4). Then host B encodes the test sample by the hypothetical secret code (step 5) and transfers the encoded test sample to host A (step S6). On the other hand, host A uses the true secret code to decode the encoded test sample (step S7) and compares the result with the original test sample (step S8). When the hypothetical secret code is the same as the true secret code, the decoding result and the original test sample also have no difference. If not, the decoding result will be different to the original test sample. Accordingly, host A should determine if the decoding result and the original test sample are matched (step S9). If they are not matched, the steps S4, S5, S6, S7 and S8 will be performed again to try another hypothetical secret code. If they are matched, it means that host B has successfully emulated the secret code (step S10).

The features of the system and method for emulating a secret code embedded in a hardware module are described as follows:

1. The secret code is generated and stored within the hardware module. No one, including the user himself, can reach the inside secret code. The disclosed method and system provide a way to distribute the secret key from one location to another location. Accordingly, one hardware module that generates a secret code and another hardware module that emulates the secret code can establish a safe communication session, even in a public network.

2. During the secret-code emulation process, the secret code is transformed during the emulation process. It means that nobody can readily guess the true secret code from the information released during the emulation process. Only hardware modules that belong to the same group have is the right to emulate the secret code. It is noted that the administrator can enable the emulation process between the hardware modules belonging to the same group, but cannot change the parameters therein, such as the transformation patterns chosen during the process. Therefore, these hardware modules can successfully encapsulate the secret code.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system of emulating a secret code between two different hardware modules, comprising a first hardware module having

- means for storing the secret code which is inaccessible from outside of the first hardware module;
- means for holding a test sample;
- means for transforming the secret code into a transformed secret code according to a transformation pattern randomly selected from a set of transformation patterns, and sending the transformed secret code to the second hardware module;
- means for decoding an encoded test sample received from the second hardware module into a temporary sample by using the secret code; and
- means for comparing the temporary sample with the test sample stored in the holding means and informing the second hardware module of a comparison result;
- and a second hardware module, coupled to the first hardware module, having:
- means for restoring the transformed secret code received from the first hardware module to obtain hypothetical secret codes by recursively trying the set of the transformation patterns, and determining one of the hypothetical secret codes to obtain an emulated secret code equivalent to the secret code when the comparison result received from the first hardware module shows that the temporary sample pertaining to the determined hypothetical secret code and the test sample are matched; and
- means for encoding the test sample into the encoded test sample by using each of the hypothetical secret codes, and sending the encoded test sample to the first hardware module.

2. The system as recited in claim 1, wherein the test sample used in the encoding means comes from the holding means of the first hardware module.

3. The system as recited in claim 1, wherein the transforming means comprises:

- means for randomly choosing one from the set of the transformation patterns;
- means for performing a transform operation complying with the chosen transformation pattern on the bits of the secret code to produce the transformed secret code; and
- means for sending the transformed secret code to the second hardware module.

4. The system as recited in claim 1, wherein the restoring means comprises:

- means for selecting one from the set of the transformation patterns;
- means for reversing the effect of the selected transformation pattern on the bits of the transformed secret code to produce the corresponding hypothetical secret code; and
- means for determining the emulated secret code from the hypothetical secret codes according to the comparison result.

5. The system as recited in claim 1, wherein one of the transformation patterns involves rotating the bits of the secret code by a fixed length of bits.

6. The system as recited in claim 1, wherein one of the transformation patterns involves swapping two bits contained in the secret code.

7. The system as recited in claim 1, wherein one of the transformation patterns involves reversing the order of the bits of the secret code.

8. A method of emulating a secret code between a first hardware module and a second hardware module, the secret code being initially stored in the first hardware module and inaccessible from outside of the first hardware module, the method comprising the steps of:

(a) transforming the secret code into a transformed secret code according to a transformation pattern randomly selected from a set of transformation patterns in the first hardware module;

(b) sending the transformed secret code from the first hardware module to the second hardware module;

(c) recovering the transformed secret code to obtain a hypothetical secret code by sequentially selecting one of the transformation patterns and reversing the effect of the selected transformation pattern on the transformed secret code in the second hardware module;

(d) encoding a test sample into an encoded test sample by using the hypothetical secret code in the second hardware module;

(e) sending the encoded test sample from the second hardware module to the first hardware module;

(f) decoding the encoded test sample into a temporary sample by using the secret code in the first hardware module;

(g) comparing the temporary sample with the test sample in the first hardware module;

(h) sending a comparison match result from the first hardware module to the second hardware module when the temporary sample and the test sample are matched, for indicating that the hypothetical secret code pertaining to the current temporary sample is an emulated secret code equivalent to the secret code; and (i) returning to step (c) when the temporary sample and the test sample are not matched.

9. The method as recited in claim 8, further comprising a step of sending the test sample from the first hardware module to the second hardware module.

10. The method as recited in claim 8, further comprising a step of sending the test sample from the second hardware module to the first hardware module.

11. The method as recited in claim 8, wherein the secret code in the first hardware module is generated by a random number generator.

12. The method as recited in claim 8, wherein one of the transformation patterns involves rotating the bits of the secret code by a fixed length of bits.

13. The method as recited in claim 8, wherein one of the transformation patterns involves swapping the bits contained in the secret code.

14. The method as recited in- claim 8, wherein one of the transformation patterns involves reversing the order of the bits of the secret code.

* * * * *